No. 649,916. Patented May 22, 1900.
C. W. DIETRICH.
BAND CLAMP.
(Application filed Jan. 13, 1899.)

(No Model.)

Witnesses:
J. Halperny
M. E. Marsh

Inventor:
Chas. W. Dietrich,
By
Attys.

THE NORRIS PETERS CO., PHOTO-LITHO., WASHINGTON, D. C.

UNITED STATES PATENT OFFICE.

CHARLES W. DIETRICH, OF CHICAGO, ILLINOIS.

BAND-CLAMP.

SPECIFICATION forming part of Letters Patent No. 649,916, dated May 22, 1900.

Application filed January 13, 1899. Serial No. 702,097. (No model.)

*To all whom it may concern:*

Be it known that I, CHARLES W. DIETRICH, of Chicago, in the county of Cook and State of Illinois, have invented certain new and useful Improvements in Band-Clamps, of which the following is a specification.

This invention relates to improvements in clamping-bands for securing non-conducting coverings, such as asbestos or the like, upon steam or other pipes, but also equally adapted for use in other situations where flexible metallic bands provided with clamping means for drawing the ends of the band together are required.

The object of the invention is to provide an improved construction in devices of this character; and it consists in the matters hereinafter set forth, and particularly pointed out in the appended claims.

Figure 1:
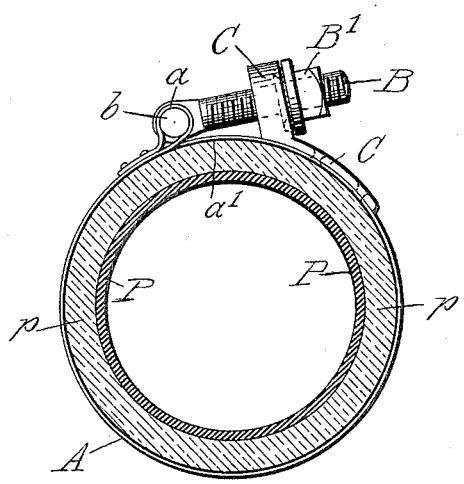
Figure 2:
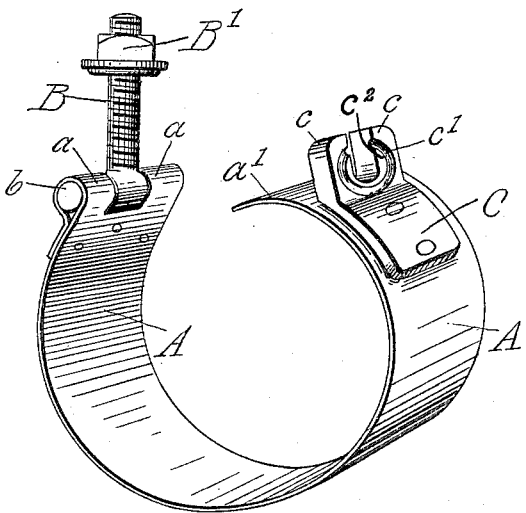
Figure 3:
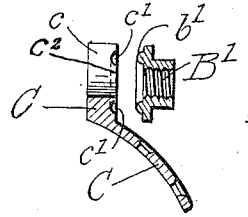

In the accompanying drawings, Figure 1 is a transverse section of a pipe having a covering that is shown as clamped in place by a band constructed in accordance with my invention. Fig. 2 is a perspective view of the band alone. Fig. 3 is a sectional detail showing the interfitting formation of the engaging surfaces of the clamping-nut and the bifurcated lug which embraces the clamping-bolt when the band is applied.

A designates the body of the band, which is of flexible construction, so that it may be wrapped around the pipe or other object to which it is to be applied, it being to this end herein shown as made of a strip of thin sheet metal having sufficient flexibility to enable it to be placed around or removed from the pipe without difficulty.

B designates a screw-bolt having a clamping-nut B' and connected with one end of the band in any suitable manner, as by a pivot-pin $b$, which is herein shown as inclosed within a loop $a$, formed by folding over and riveting the end of the sheet-metal body A. C designates a bifurcated lug securely fastened to the other end of the band by riveting or otherwise and adapted to receive the shank of the bolt B between ears $c$, which form its projecting bifurcated portion. Desirably and as herein shown the lug C is not located quite at the end of the band; but the extremity $a'$ of the latter projects beyond the lug and normally underlies the overlapping looped end $a$, to which the bolt B is secured, thus serving to bridge the space spanned by the bolt itself.

To prevent the ears $c$ from being forced apart by the pressure of the clamping-nut when the band is tightened, as is found to be the tendency unless special means are provided to prevent it, and to prevent the bolt from accidentally slipping from between said ears when the nut is tightened, the proximate surfaces of the nut and lug are constructed with concentric interfitting corrugations. As herein shown, these consist of a rib $b'$ on the nut, which enters a groove $c'$ in the face of the lug, so that when the nut is tightened the parts are, in effect, locked in fixed relation laterally with respect to each other. This is a feature of great importance in the practical construction of a device of this character.

In Fig. 1 a band thus constructed is shown as applied to a pipe P to hold an asbestos or other covering $p$ in place on the pipe, the manner of its application being so readily understood as to require no further explanation. Obviously this is only one of the many situations in which the device can be advantageously used. It is especially well adapted for hose-couplings and for holding lagging in place on pipes and cylinders and for almost any other purpose for which clamping-bands are employed.

It will be observed that the groove $c'$ is located away from the edge of the slot forming the ears, so that a flange $c^2$ is formed which extends entirely around the inner end of the slot, which not only insures the locking together of the two ears and the nut, but at the same time leaves the nut free to be turned, as usual, to tighten or remove the clamp.

As is well known, the best (because it is the simplest and cheapest) form of connection for clamp-bands of the sort herein referred to is the pivoted-bolt and nut device, the bolt being pivoted to one end of the band and the nut being adapted to engage a bifurcated lug on the other end, as shown; but as heretofore constructed this form of fastening is seriously objectionable, because the conical boss necessarily employed to prevent the nut slipping off the lug frequently spreads the lugs apart and breaks them, rendering the clamp useless. I avoid this objection by the interfitting and interlocking projection and depression, which is preferably in the form of the concentric rib and groove shown, so as to not only permit the nut to be turned, as usual, and prevent it slipping off the ears, but also to lock the two ears to the nut, and thereby prevent lateral spreading.

I claim as my invention—

1. A band-clamp comprising a flexible body having attached to one end a screw-bolt and to its other end a lug slotted to receive said bolt, and a device adjustable on the free end of the bolt and adapted to engage the lug upon opposite sides of the slot therein, the contacting faces of the ears of the lug and said device being provided with interlocking projections and depressions, whereby said device and the ears are locked together and lateral spreading of the ears is avoided.

2. A clamp, consisting of a flexible body, a bolt attached to one end thereof, a nut on the free end of the bolt, a lug on the other end of the body, slotted to form ears between which the bolt is received, a groove-and-rib lock being formed in the contacting faces of the nut and ears thereby locking the nut and ears together laterally.

3. A band-clamp comprising a flexible body, a screw-bolt connected to one end of the body and carrying at its free end an adjustable clamp-nut, and a slotted lug secured to the other end of the band and adapted to receive the bolt between its ears, the contacting faces of the nut and ears being provided with a concentric interlocking rib and groove, set back from the edge of the slot and locking the ears to the nut and thereby securing them against lateral spreading.

4. A band-clamp comprising a flexible body, a screw-bolt pivotally connected at one end to one end of the band and provided with an adjustable nut on its free end, the other end of the band being provided with a lug slotted to form a pair of ears, the bolt being adapted to fit between the ears and the nut to bear upon the same, the contacting faces of the nut and lug being provided with an interlocking, concentric rib and groove, extending entirely around the inner end of the slot and upon both ears, for the purposes set forth.

In testimony that I claim the foregoing as my invention I affix my signature hereto, in the presence of two subscribing witnesses, this 3d day of January, 1899.

CHAS. W. DIETRICH.

Witnesses:
 HENRY W. CARTER,
 M. E. MARSH.